Sept. 10, 1946.   C. C. LUNDY ET AL   2,407,310
SCANNING DEVICE
Filed Feb. 27, 1943   4 Sheets-Sheet 1

INVENTORS
C. C. LUNDY
H. LANGSTROTH
BY
ATTORNEY

Sept. 10, 1946.  C. C. LUNDY ET AL  2,407,310
SCANNING DEVICE
Filed Feb. 27, 1943  4 Sheets-Sheet 2

INVENTORS
C. C. LUNDY
H. LANGSTROTH
BY
ATTORNEY

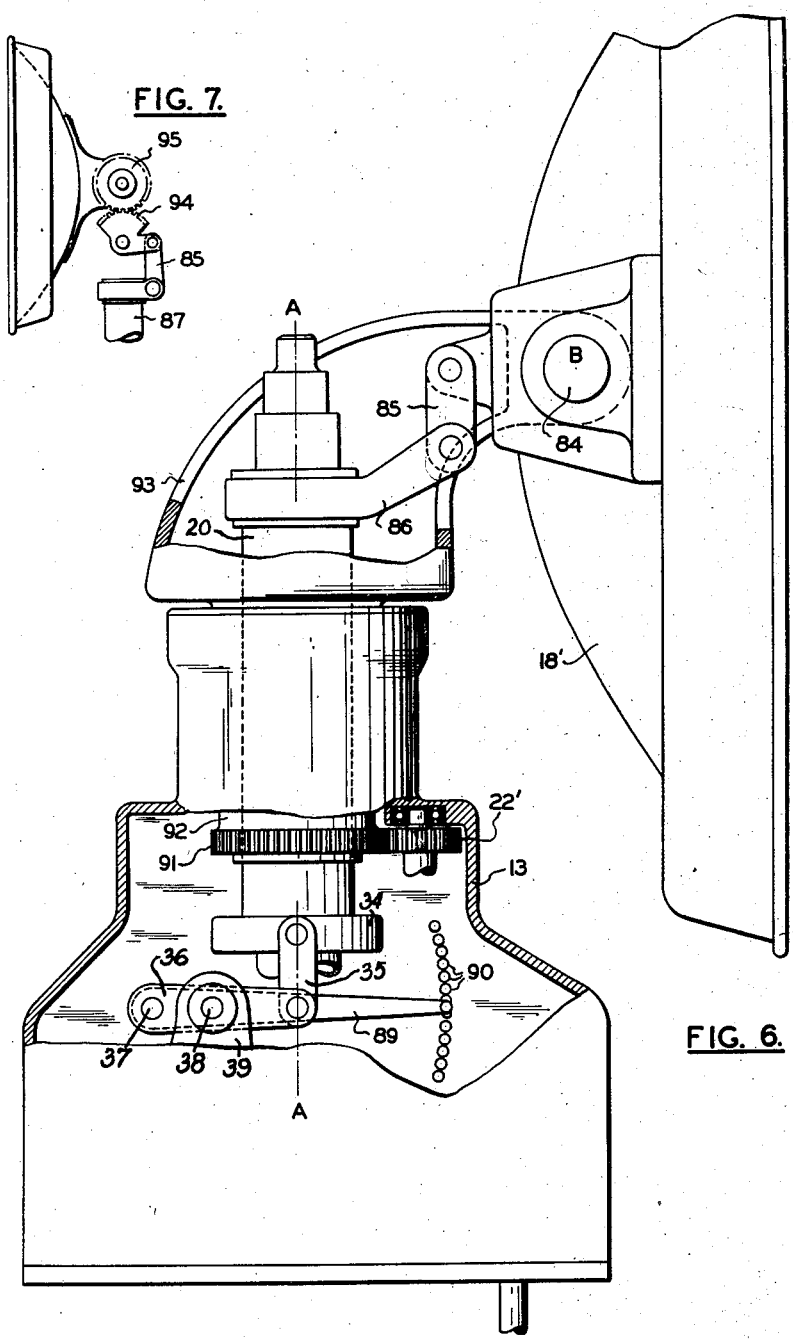

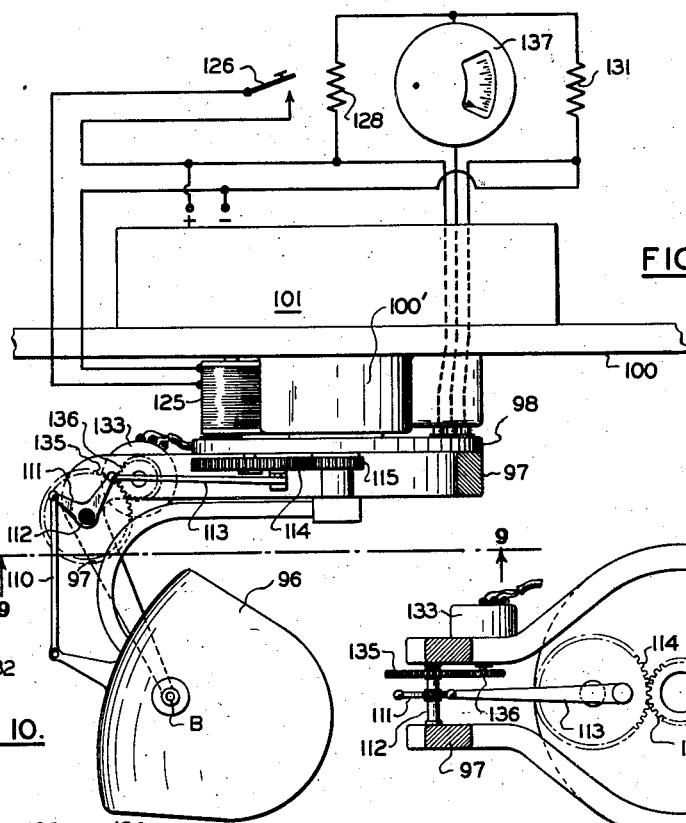

Patented Sept. 10, 1946

2,407,310

UNITED STATES PATENT OFFICE 2,407,310

SCANNING DEVICE

Clarence C. Lundy, Floral Park, N. Y., and Hall Langstroth, Greenwich, Conn., assignors to Sperry Gyroscope Company, Inc., Brooklyn, N. Y., a corporation of New York Application February 27, 1943, Serial No. 477,466

18 Claims. (Cl. 250—11)

This invention relates to scanning apparatus for projecting and receiving beams of radiant energy such as high frequency radio beams and is more particularly concerned with a special movement-controlling mechanism for the apparatus.

In accordance with the preferred embodiment of the invention showing the same as a wide angle scanning device, the reflector or scanning member of a short wave antenna is continuously rotated about a first or "spin" axis and at the same time is oscillated about a second or "nod" axis.

One of the features of the present invention resides in the provision of means for selectively arresting the scanning member at any desired position in the range of its permitted oscillatory movement while maintaining continuous motion about the spin axis.

A further provision of the invention consists in the utilization of a single drive means for obtaining motion about the spin and nod axis with the employment of a clutch or disengageable connection between the nod determining mechanism and the drive means which is simultaneously disengaged when the nod asserting means of the apparatus is rendered effective.

Other features and structural details of the invention will be apparent from the following description when read in relation to the accompanying drawings, wherein Fig. 1 is an elevation partly in section, of a preferred embodiment of the invention wherein the reflector is oscillated through an eccentric drive, and an electrically controlled clutch is provided for arresting oscillation;

Fig. 6 is an elevation, partly in section, of a further embodiment of the invention wherein the oscillation mechanism controls a stop selector switch device;

Fig. 7 is a fragmental view in elevation illustrating a further manner of converting translation drive movement to oscillation of the reflector;

Fig. 8 is an elevation view of a further modified form of our invention;

Fig. 9 is a section view taken along line 9—9, in Fig. 8;

Fig. 10 is a detail view of the potentiometer illustrated in Figs. 8 and 9; and

Fig. 11 is an enlarged vertical section of the scanning mechanism shown in Figs. 8 and 9.

Figure 1:
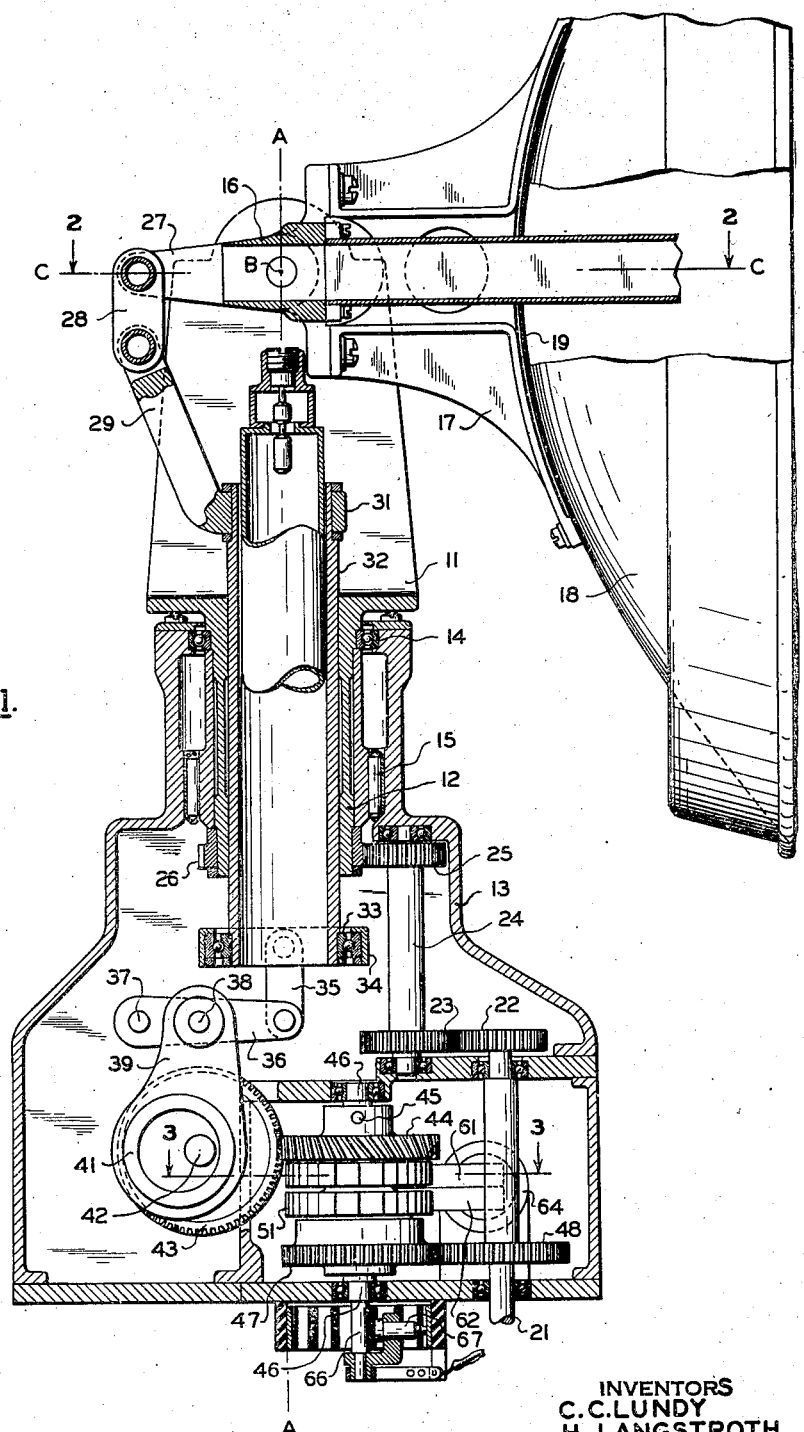

As shown in Fig. 1, a yoke 11 is formed with a depending hollow cylindrical collar 12 which projects into a drive mechanism casing 13. Collar 12 is suitably supported on the casing 13 as by bearings 14 and 15, for rotation about an axis A—A.

Figure 2:
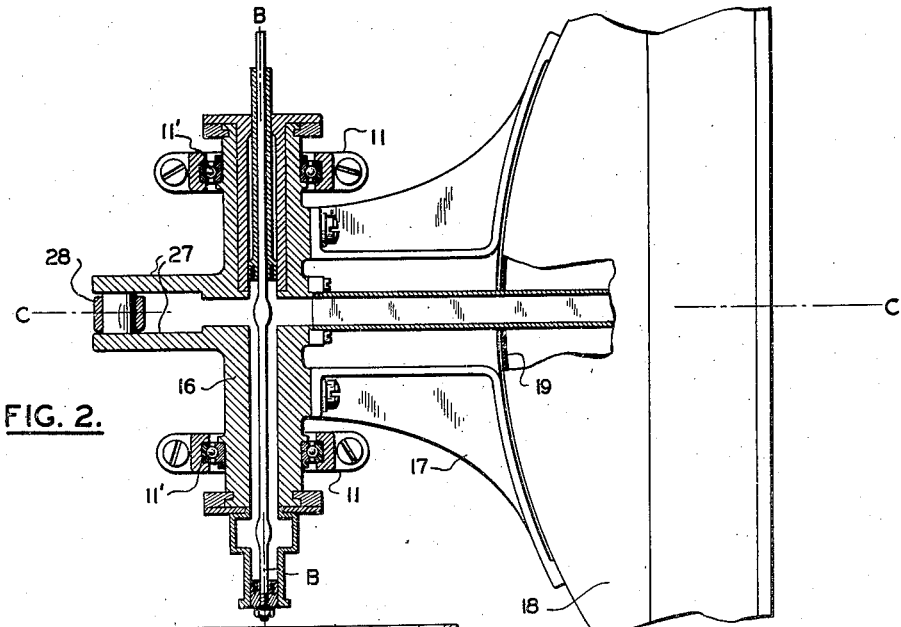
Fig. 2 is a section along line 2—2 of Fig. 1, illustrating how high frequency energy is introduced into the reflector.

Yoke 11, as shown in Fig. 2, is provided with aligned bearings 11' in its arm for supporting a reflector mounting member 16 for oscillation about axis B—B which is preferably at right angles to axis A—A. Axis B—B is at right angles to the plane of the paper in Fig. 1, being indicated therein at B. A bracket 17, rigidly fastened to member 16, projects therefrom and carries a reflector unit 18 having a parabolic reflector surface 19. The axis C—C of reflector 18 is mutually perpendicular to axes A—A and B—B respectively.

At the end of casing 13 opposite the reflector 18, a shaft 21, driven by a suitable motor (not shown) extends within the casing and is connected by gears 22 and 23, shaft 24 and gear 25 to a gear 26 rigid with the end of collar 12. Thus when shaft 21 is driven, collar 12 and the whole reflector assembly carried thereby are continuously rotated about the spin axis A—A at predetermined speeds. This accomplishes one scanning movement of the reflector.

Reflector mount member 16 is formed with spaced lugs 27 extending rearwardly from the reflector and providing a bifurcated pivoted connection with a link 28. Link 28 is also pivoted to an arm 29 rigidly connected, as by collar 31, to one end of a slideable sleeve 32 extending through collar 12.

Beyond the point it projects from the other end of the collar 12 within casing 13, sleeve 32 is connected by a suitable bearing ring 33 to a freely rotatable collar 34 which is fixed against axial displacement relative to sleeve 32. A link 35 is pivoted at one end to collar 34 and at its other end to the free end of a lever 36 movable about a fixed pivot 37 on the casing.

Lever 36 is pivoted intermediate its ends at 38 to one end of a link 39, and the other end of link 39 is formed as a strap fitting about an eccentric cam 41 fixed to a shaft 42. A helical gear 43 is fixed to shaft 42 meshed with another helical gear 44 fastened, as by pin 45, to a countershaft 46.

Figure 4:
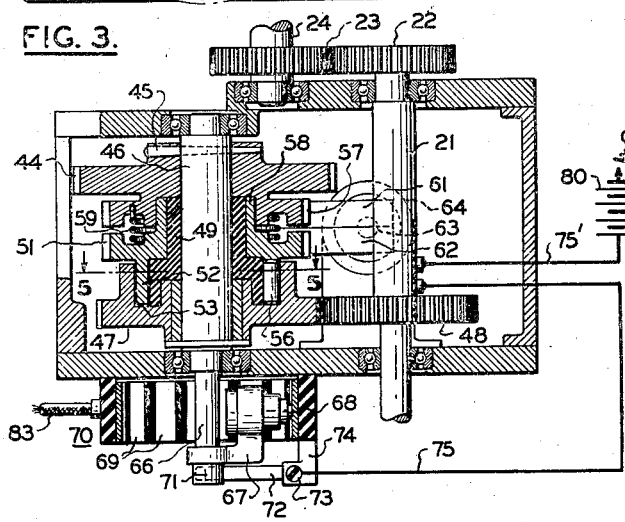
Fig. 4 is an enlarged elevation, partly in section, of the oscillation drive and arresting means for controlling oscillation of the reflector.
Figure 4:
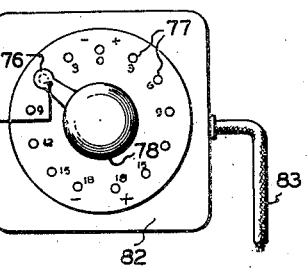

Referring now to Fig. 4, a gear 47 is freely rotatably mounted on the other end of countershaft 46 and is meshed with a drive gear 48 rigid with drive shaft 21. To countershaft 46 there is keyed a cylindrical bushing 49 on which is freely rotatably mounted a ratchet member 51 having an interrupted annular flange 52 projecting back axially within a suitably formed groove 53 between bushing 49 and gear 47.

Figure 5:
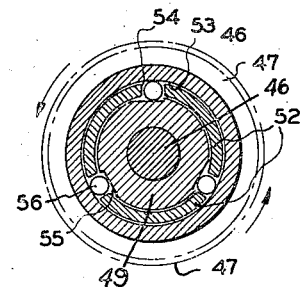
Fig. 5 is a section along line 5—5 of Fig. 4 illustrating further the clutch in the mechanism of Fig. 4.

Referring now to Fig. 5, flange 52 is formed to include a plurality of axial slots 54, preferably equispaced as shown. Opposite slots 54, the inner periphery of groove 53 is provided with axially extending plane surfaced recesses 55. Each slot 54 contains a cylindrical roller 56 having a diameter slightly larger than the width of groove 53 but less than the radial width of the space between the outer periphery of groove 53 and the adjacent wall of recess 55. The circumferential dimension of each slot 54 is preferably slightly larger than the diameter of the roller 56 therein to permit a small displacement of the roller circumferentially of the flange.

The above described connection between gear 47 and ratchet member 51 functions as a clutch in fulfilling the purposes of the invention. Gear 47 rotates only in the direction shown by the arrows in Fig. 5. With gear 47 driven in the direction of the arrow in Fig. 5 and flange 52 free to move in the same direction as a result of ratchet 51 being unrestrained by pawl 62, gear 47 rolls roller 56 after it in the same direction carrying flange 52 before it until roller 56 enters the narrowed down or restricted area of groove 53 and becomes wedged between the adjacent walls of groove 53 and recess 55 so that flange 52, ratchet 51, bushing 49 and gear 46 are thereby positively driven in the same direction as gear 47. When flange 52 is seized and held stationary by pawl 62 and a brief interval thereafter ratchet 57 is likewise seized and held by pawl 61, roller 56 is displaced from its wedging position to become freely rotatable within groove 53 and to permit relative rotation between gear 47, flange 52 and ratchet 51, thus allowing reflector 18 to cease nodding. Any equivalent clutch may be employed in the connection between gear 47 and ratchet 51 without departing from the spirit of the invention.

Ratchet 51 is one part of the resilient coupling, the other part of which is a ratchet member 57 rigid with gear 44 and journaled on the projecting cylindrical hub 58 of ratchet 51. A coiled spring 59 has its opposite ends anchored in ratchet members 51 and 57, and is coaxial with shaft 46 as shown in Fig. 4. Spring 59 permits flange 52 to move relative to ratchet 57 and bushing 49 sufficiently to allow roller 56 to move from its wedged to its free rolling position and vice versa. As will appear any equivalent flexible coupling may be used between ratchet members 51 and 57 without departing from the spirit of the invention.

Thus, when ratchet member 51 is driven by gear 47, gear 44 is driven through the resilient coupling to rotate eccentric 41. Eccentric 41 causes oscillation of lever 36 about fixed pivot 37 to thereby reciprocate sleeve 32 parallel to axis A—A. The bearing ring at 33 permits simultaneous rotation of sleeve 32 about axis A—A. As sleeve 32 reciprocates, it operates through arm 29 and link 28 to rock the reflector mount about axis B—B, the angular spread of this rocking movement on opposite sides of axis C—C being determined by the relation of the cam and link mechanism. Preferably, the reflector is rocked through an angle of about 20° to each side of axis C—C, Fig. 1, a total sweep of 40°. This nod movement of the reflector about axis B—B takes place at a substantially lower speed than the speed of revolution of the reflector about axis A—A, and the scanning is accomplished in a substantially spiral path through a generally solid cone of 40° apex angle.

Figure 3:
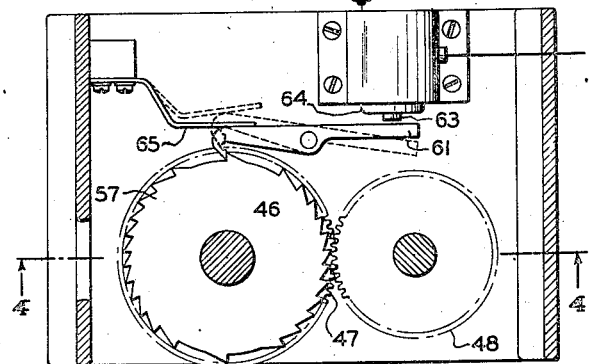
Fig. 3 is a section along line 3—3 of Fig. 1, illustrating the oscillation arresting mechanism in plan.

With reference to Fig. 3, the mechanism will now be described for arresting the nod of reflector 18 in any of the plurality of manually selected positions during its 40° angular sweep, and maintaining it fixed at the nod angle during continued rotation about axis A—A.

Ratchet members 57 and 51 are adapted to be engaged in close succession by individual pivoted stop pawls 61 and 62 which are simultaneously actuated by the same plunger 63 of solenoid 64. A known type of spring (not shown) maintains plunger 63 extended to hold pawls 61 and 62 in the retracted dotted line position of Fig. 3 when solenoid 64 is not energized. When solenoid 64 is energized, plunger 63 is retracted, permitting suitable springs 65 (one shown) to urge the pawls into arresting engagement with the ratchet members.

The ratchet and pawl arrangement serves as a holding means for positioning the scanning member or reflector in any one of a plurality of positions within the range of the oscillatory movement thereof. This holding means is normally ineffective and, when rendered effective, operates to disengage the clutch means described so that under this condition no further movement is communicated to the nod mechanism by the common drive shaft which continues to rotate the scanning member about its spin axis.

The selective means for controlling the operation of the solenoid 64 may be considered to include a circuit that contains the solenoid, a source of energy and a pair of switches, one of which is manually adjusted. In the present instance, the projecting reduced end 66 of shaft 46 carries a rigid radial bracket 67 mounting a conductor brush 68. The brush 68 is adapted to successively traverse a series of equispaced conductor segments 69 of a commutator 70 fixed to casing 13. Conductor brush 68 is connected to a slip ring 71 mounted on the bracket 67. A conducting arm 72 mounted at 73 on post 74 yieldably engages the slip ring 71. Lead 75 connects the arm 72 and one terminal of the solenoid 64. The selective circuit further includes, lead 75' connected to the other terminal of the solenoid 64, a battery 80, off-on switch 81 and a manually adjustable selector switch generally designated at 82. Switch 82 includes a settable knob 78 having an arm 76 that connects with one of a number of contact points 77, there being one contact point for each of the segments 69 of the commutator. These individual connections are made through multiple conductor cable 83. In the present instance, thirteen contacts 77 are provided, the same having individual indications thereon showing the operator the necessary position of arm 76 to effectively control the arresting mechanism to stop the scanning member at a corresponding position in the path of its permitted oscillatory movement. Correspondingly, thirteen segments 69 are provided with angular spacings of 3°. Obviously, the number of segments 69 and the angular spacing between stop positions of the scanner may be varied as desired without departing from the spirit of the invention. The scanning reflector may be positioned at any one of thirteen positions about its nod axis over a range of 36°. In operation, the operator, for example, sets the knob 78 to the contact on which it is positioned in Fig. 4, namely, —6°. When brush 68 moves to position the segment 69 to which this corresponding contact 77 is connected, the circuit is closed, solenoid 64 being energized to release the pawls 61—62 at the proper moment to engage the ratchets 51—57 and correctly position the scanning member with a nod of —6° about its nod axis.

In the modification of the invention shown in Fig. 6 the reflector unit 18' nods about an axis provided by pivot connection 84 through means of link 85, arm 86 and the reciprocating sleeve 20. The sleeve may be moved by the eccentric cam mechanism previously described through means of the bail 36, one arm of which is connected to the sleeve by link 35 and the other arm of which as noted at 89 performs the function of the commutator arrangement described in connection with Fig. 4. The conducting arm 89 of the bail slides over thirteen contacts 90 mounted on the frame or casing of the apparatus, contacts 90 corresponding to the segments 69 of the commutator. The same operates in connection with the selector switch 82 and detail circuit previously described to perform the function of stopping the scanning member at a desired position within the range of its movement about the nod axis provided by pivot connection 84. The scanning member is continuously rotated about its axis A—A by the drive means previously described, including drive gear 22' which in this construction meshes with gear 91 on the rotating sleeve 92 on which the mounting frame 93 is fixedly mounted. Rotating frame 93 has a laterally extending bifurcated portion which contains the spaced bearings which form a part of the pivotal connection 84 of the scanner mounting. Link 85 is directly connected to the rear of the member 18' and moves in response to the nod driving mechanism to oscillate the member about the nod axis while the member continues to spin about the axis A—A.

In the modification of the invention shown in Fig. 7, the motion of link 85 is communicated to the scanner member by means of a sector and gear connection, the respective parts of which are designated at 94 and 95.

In the form of the invention illustrated in Figs. 8 to 11, inclusive, the scanning member 96 is mounted for movement about a nod axis B by means of a yoke 97, the spread extending arms of which pivotally support the member. Yoke 97 is fixedly mounted on the bottom of a turntable 98 whose axis is defined by bearings 99 that provide the spin axis A—A of the scanning member 96. Bearings 99 are mounted in the hub 100' of a fixed frame 100 on the top of which is mounted a casing 101 that contains the parts of the improved mechanism situated above the frame. Turntable 98 is fixed to a sleeve 102 which also includes a gear 103. Continuous rotary movement for the turntable is communicated to the sleeve 102 by way of gear 103 which is driven by a gear 104 that is keyed to a drive shaft 105. The shaft 105 may be driven by suitable motive means such as a motor (not shown) whose continuous motion is communicated to the same by way of the worm 106 and worm wheel 107. Shaft 105 is suitably mounted in the frame and casing by means of bearings 108 and 109. It will be understood that the described mechanism for spinning the scanning member accomplishes this purpose by the continuous movement of turntable 98 and the yoke 97 fixed thereto on which the member is mounted.

Means for moving the scanning member about its nod axis B is provided in this instance by a mechanism which includes link 110, bell crank 111 mounted between the extending arms of the yoke on shaft 112 and the link 113. One end of the link 113 is universally connected to one of the arms of the bell crank 111, the other end of the same being pivotally connected to nod gear 114 mounted on a stub shaft extending from the bottom of turntable 98. The connection of the link 113 and gear 114 is eccentric to the axis of the gear 114 so that, as the gear rotates, oscillating movement is imparted to the bell crank by the link which moves the scanning member about the nod axis. Gear 114 is driven by gear 115, coaxial with spin axis A—A, and mounted on a sleeve 116 on the upper portion of which are the concentric drive gears 117 and 118. Gear 118, which has the same diameter as the drive gear 103 of the mechanism by which the member is rotated, forms a part of the arresting mechanism for controlling the movement of the member about its nod axis. Gear 117 is of smaller diameter than the gears 118 and 103 and is normally effective to drive the gear 115 at a higher R. P. M. than the R. P. M. of the turntable 98. Such relative movement drives the nod gear 114 and moves the scanning member about the nod axis in the manner previously described.

Instead of the clutch provided in the form of the invention shown in Fig. 1, we employ a disengageable connection for rendering the nod engaging means ineffective and the arresting means effective. In the construction shown, gear 120 which meshes with gear 118 is loosely mounted on the drive shaft 105 and is supported by means of a collar. Gear 121 which meshes with gear 117 is similarly mounted on the shaft 105. The adjacent faces of the axially spaced gears 120 and 121 have radial grooves therein which receive a tongue 122 that extends through two axial slots in the shaft 105 and is fixed to an elongated pin 123 located in a central axial opening in the shaft. Pin 123 rotates with the shaft 105 and is axially movable therein, the parts being normally positioned as shown in Fig. 11 by means of spring 124 so that the tongue 122 engages the groove in the gear 121 locking the gear to the shaft 105 and consequently driving gear 117 to effect nodding movement of the scanning member. It will be understood that with gear 121 rendered effective by the disengageable connection, gear 120 and the arresting mechanism controlled thereby are ineffective.

To bring the arresting mechanism into operation, pin 123 is urged in a direction to compress the spring 124. This movement is accomplished when a solenoid 125 is energized by closure of switch 126. Plunger 127 at one end of the pin is raised upwardly, thus elevating the pin and moving the tongue 122 out of engagement with gear 121 and into engagement with gear 120. By this action gear 118 is driven directly by the shaft 105. Gears 118 and 103 which are the same diameter are then driven by the shaft 105 so that the turntable 98 and gear 115 rotate at equal speeds. No motion in this event is communicated from gear 115 to nod gear 114 and movement of the scanning member about its nod axis stops. When switch 126 is opened, the parts return to their normal position of operation.

In order that the operator of the apparatus be informed of the angular position of the scanning member at a given instant, a bridge circuit is employed in which resistors 128—130 and 131—132 are situated in the respective branches thereof. Resistors 130 and 132 are situated in a potentiometer 133 mounted on the yoke 97 of the apparatus. The moving arm 134 of the potentiometer is controlled from shaft 112 of the bell crank 111 by way of gears 135 and 136. An ammeter 137 is connected across the branches of the bridge circuit, the pointer of which swings through an arc following the movement of the scanning member about its nod axis. The scale of the ammeter is calibrated in degrees to indicate the instantaneous position of the member. By closing the switch at a desired time, the operator is thus able to arrest the scanning member at any particular nod angle desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A scanning apparatus comprising a scanning member, driving means, means actuated by said driving means for spinning said scanning member about a first axis, means actuated by said driving means for oscillating said scanning member through a predetermined angle about a second axis, arresting means for stopping said oscillating means without interruption of the rotation of said scanning member about said first axis, and selective means for presetting said arresting means to stop the oscillation of said scanning member at a chosen angle of nod.

2. An apparatus as claimed in claim 1, in which said scanning member is the reflector of an antenna that receives or transmits high frequency electrical energy.

3. In a scanning apparatus, a rotatable scanning member, drive means for rotating said member about a first axis, means mounting said member for oscillation about a second axis disposed at an angle to said first axis, normally effective means actuated by said drive means for oscillating said member about said second axis, and stop means, rendering said oscillation actuating means ineffective, for selectively arresting said member at a desired position in the path of its movement about the second axis.

4. In a scanning apparatus, a scanning member mounted for movement about a spin axis, means for spinning said member, a mounting for said member providing a second axis about which the member nods, means for nodding said member, normally inactive stop means for said nodding means for arresting said member in one of a plurality of positions in the range of its movement about the second axis, and selective means for rendering said stop means active, said means for spinning said member and said means for nodding said member being driven from a common drive shaft.

5. A scanning apparatus comprising a scanning member mounted for movement about a spin axis and a nod axis, drive means both for spinning and nodding said member, and a stop means for selectively arresting the nod movement of the member at one of a plurality of positions while the member continues to move about its spin axis.

6. An apparatus as claimed in claim 5, in which said scanning member is the reflector of a radiator or receiver for high frequency electrical energy.

7. In a scanning apparatus, a movable scanning member, drive means both for spinning said member about a first axis and for nodding said member about a second axis disposed at an angle to the first axis, and stop means for the nod driving means for selectively arresting the member at one of a plurality of positions in the range of its movement about the second axis.

8. In a scanning apparatus, a movable scanning member, drive means for spinning said member about a vertical axis, drive means for nodding said member about a horizontal axis, stop means for said nod driving means for arresting the member at one of a plurality of positions in the range of nod movement thereof, electromagnetic means for controlling said stop means, and selective switch means for actuating said electromagnetic controlling means.

9. In a scanning apparatus, a scanning member mounted for movement about two perpendicularly disposed axes, mechanism for spinning said member about one of the axes, mechanism for nodding the member about the other axis including normally inactive means for holding the member in one of a plurality of nod positions, a unidirectional drive means common to said mechanisms, clutch means connecting said drive means and said nod mechanism, and selective means for rendering said holding means active to disengage said clutch means as said scanning member arrives at a predetermined angle of nod.

10. An apparatus as claimed in claim 9, in which said selective means is provided by a circuit having a solenoid and a controlling switch therein.

11. In a scanning apparatus, a scanning member mounted for oscillation about an axis, normally operative mechanism for constantly oscillating said member including normally inactive means for holding the member in one of a plurality of positions, drive means for said constantly oscillating mechanism, clutch means connecting said drive means and said oscillating mechanism, and means for simultaneously disengaging said clutch means and selectively rendering said holding means active.

12. An apparatus as claimed in claim 11, in which said holding means includes a pair of coaxial, spring coupled ratchets and a pair of cooperating normally inactive pawls.

13. An antenna for short wave electrical energy including a reflector having vertical and horizontal supporting axes, means for spinning the reflector about its vertical axis, means for nodding the reflector about its horizontal axis, drive means for said spinning and nodding means, clutch means connecting said drive and nodding means, normally ineffective holding means for retaining said reflector in one of a plurality of nod positions, and means for simultaneously disengaging said clutch means and selectively rendering said holding means effective.

14. An antenna as claimed in claim 13, in which said last-named means is a circuit having a solenoid and a position selecting switch therein.

15. In a scanning apparatus, a movable scanning member, drive means for spinning said member about a first axis, normally active drive means actuated from said spinning drive means for nodding said member about a second axis disposed at an angle to the first axis, normally inactive means for arresting the member at a preselected position within the range of its movement about the second axis, and means for simultaneously rendering said nod drive means inactive and said arresting means active.

16. In a scanning apparatus, a scanning member mounted for movement about a spin axis, means for spinning said member, a mounting for said member providing a second axis about which the member nods, means actuated from said spinning means for nodding said member, normally inactive means for arresting said member to position the same as desired within the range of its movement about the nod axis, and means for simultaneously rendering the nodding means inactive and said arresting means active.

17. In a scanning apparatus, a scanning member having freedom of rotation about two angularly displaced axes, driving means for spinning said member about a first axis, normally active means cooperative with said spinning means for nodding said member about a second axis, means for disengaging said nodding means from said spinning means, and means for accurately stopping said scanning member at a desired position about the second axis thereof.

18. In a scanning apparatus including a scanning member, driving means for spinning said scanning member about a first axis, and oscillating means actuated by said driving means for nodding said scanning member about a second axis, the combination comprising means for arresting the nod of said scanning member about said second axis without stopping its spin about said first axis and selective means for presetting said arresting means to stop the oscillation of said scanning member at a chosen angle of nod.

CLARENCE C. LUNDY.
HALL LANGSTROTH.